(12) United States Patent
Yamazaki

(10) Patent No.: US 7,466,673 B2
(45) Date of Patent: Dec. 16, 2008

(54) WCDMA UTRAN SYSTEM

(75) Inventor: Makoto Yamazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 1021 days.

(21) Appl. No.: 10/446,712

(22) Filed: May 29, 2003

(65) Prior Publication Data
US 2003/0223360 A1 Dec. 4, 2003

(30) Foreign Application Priority Data
May 30, 2002 (JP) .............................. 2002-158128

(51) Int. Cl.
H04Q 7/00 (2006.01)
(52) U.S. Cl. ........................................ 370/328; 370/401
(58) Field of Classification Search ................ 370/229, 370/328, 335, 338, 342, 401, 465
See application file for complete search history.

(56) References Cited

U.S. PATENT DOCUMENTS

| 5,923,849 | A  | * | 7/1999  | Venkatraman | 709/224 |
| 6,765,887 | B1 | * | 7/2004  | Shiu et al. | 370/329 |
| 6,829,482 | B2 | * | 12/2004 | Rune et al. | 455/442 |
| 7,136,412 | B1 | * | 11/2006 | Gavish et al. | 375/222 |
| 7,206,332 | B2 | * | 4/2007  | Kwan et al. | 375/140 |

OTHER PUBLICATIONS

European Search Report dated Nov. 10, 2003.

NTT DoCoMo: Proposal of revival of Normal mode in UL Iur/Iub FP, TSG-RAN Working Group 3 Meeting #7, R3#7(99)C41, Online!, Sep. 20-24, 1999, pp. 1-5, XP-002258715.

Interdigital, "Proposed CR-036 to TS25.224 on DTX and Special Burst Scheduling", TSG-RAN Working Group 1 Meeting #18, TSGR1#18(01)0153, 'Online!, Jan. 15-18, 2001, pp. 1-5, XP-002258716.

3GPP RAN S1.14 V2.0.0, UTRA FDD; Physical Layer Procedures, Chapter 8—Feedback mode transmit diversity, Apr. 1999, pp. 1-32, XP-002184716.

(Continued)

Primary Examiner—Firmin Backer
Assistant Examiner—Christine Ng
(74) Attorney, Agent, or Firm—McGinn, IP Law Group, PLLC

(57) ABSTRACT

In a WCDMA UTRAN system, the amount of data on a DCH is suppressed. In the system disclosed herein, nodes B3 and B4 which communicate with a UE 5 via a point Uu and an RNC 2 which communicates with a CN 1 through a point Iu are connected via a point Iub, a normal or silent mode is used for the DCH in the uplink side in the direction from the nodes B to the RNC, and the normal mode is used for the DCH in the downlink side in the direction from the RNC to the nodes B. In this system, a semi-normal mode is provided in which: when a no-data frame is received from the RNC, the nodes B do not transmit data to the UE; when data is not received from the UE, the nodes B transmit a no-data frame to the RNC for every plural TTIs; when data is not received from the nodes B, the RNC does not transmit data to the CN; and when data is not received from the CN, the RNC transmits a no-data frame to the nodes B for every plural TTIs.

19 Claims, 19 Drawing Sheets

OTHER PUBLICATIONS

ETSI: "Universal Mobile Telecommunications System (UMTS); UTRAN Iub/Iur Interface User Plane Protocol for DCH Data Streams (3GPP TS 25.427 version 5.0.0 Release 5)" ETSI TS 125 427 V5.0.0, Mar. 2002, pp. 1-35, XP-002258717.

NTT DoCoMo. "Proposal of revival of Normal mode in UL Iur/Iub FP", TSG-RAN Working Group 3 Meeting # 7, Sep. 20-24, 1999, pp. 1-5.

InterDigital, "Proposed CR-036 to TS25.224 on DTX and Special Burst Scheduling", TSF-RAN Working Group 1 Meeting # 18. Jan. 15-18, 2001, pp. 1-5.

3GPP RAN S1.14 V2.0.0. Physical layer procedures, Apr. 1999, pp. 1-32.

Japanese Office Action dated Jun. 15, 2004 with Partial English Translation.

Chinese Office Action dated Jun. 10, 2005.

"Proposal of revival of Normal Mode in UL Iur/Iub FP", Sep. 30, 1999, NTT DoCoMo, TSG-RAN Working Group 3, Meeting #7, Sophia-Antipolis, France.

* cited by examiner

FT:Frame Type 0=data,1=control

Control Frame Type
1      Outer loop power control
2      Timing Adjustment
3      DL Synchronization
4      UL Synchronization
5      DL signalling for DSCH
6      DL Node Synchronization
7      UL Node Synchronization
8      Rx Timing Deviation
9      Radio Ineterface Parameter Update
10-255 not assigned

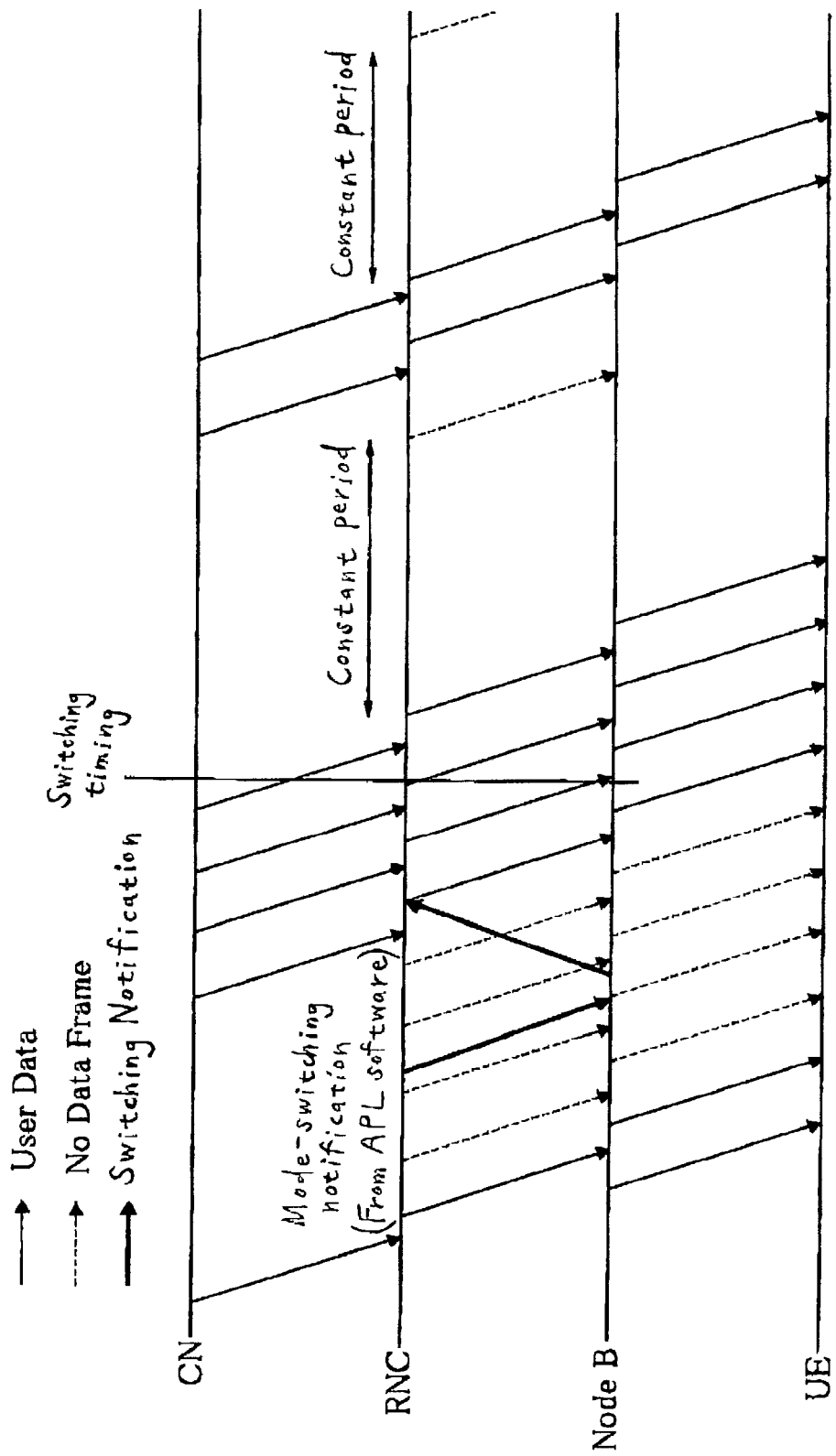

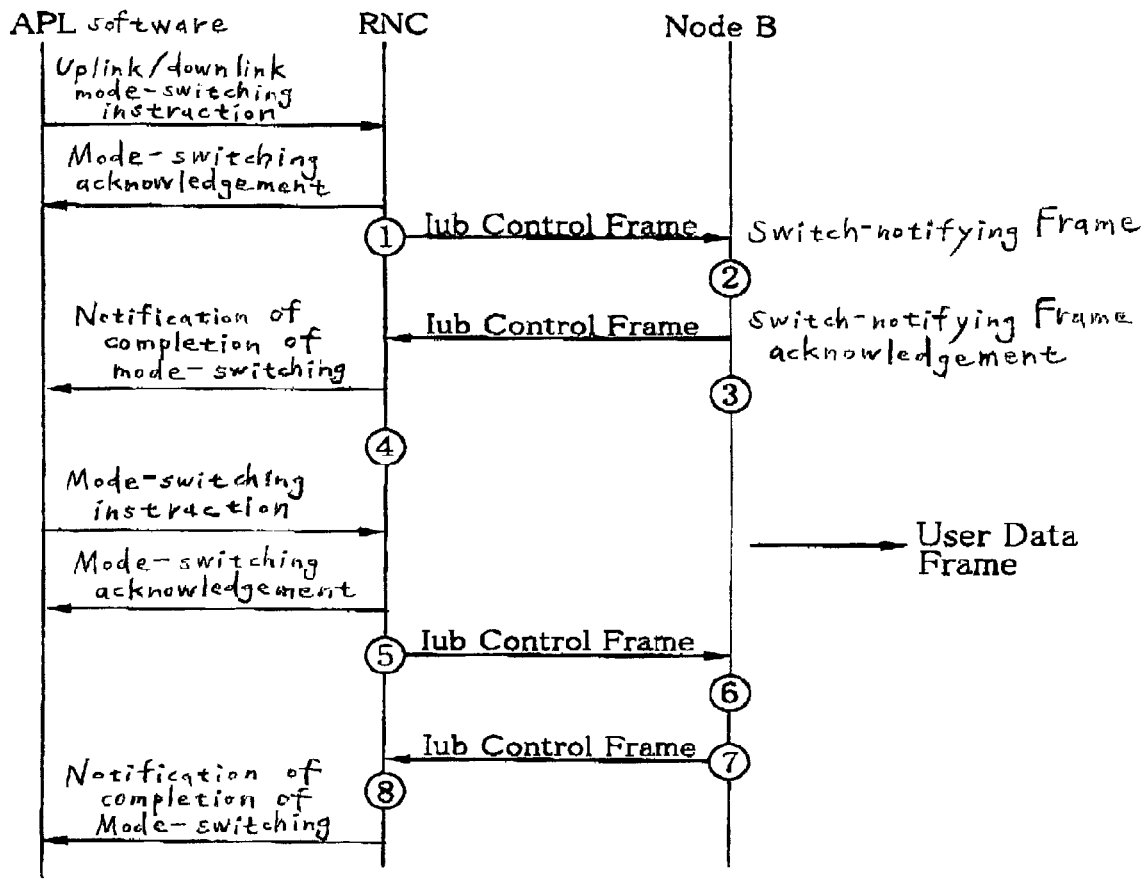

① The RNC switches the direction of node B → RNC to the semi-normal

② The node B switches the direction of node B → RNC to the semi-normal

③ The node B switches the direction of RNC → node B to the semi-normal

④ The RNC switches the direction of RNC → node B to the semi-normal

⑤ The RNC switches the direction of RNC → node B to the normal

⑥ The node B switches the direction of RNC → node B to the normal

⑦ The node B switches the direction of node B → RNC to the normal

⑧ The RNC switches the direction of node B → RNC to the normal

FIG 8

① The RNC is started in the semi-normal mode
② The node B is started in the semi-normal mode

WCDMA UTRAN SYSTEM

BACKGROUND OF THE INVENTION

The present invention relates to a WCDMA (Wideband Code Division Multiple Access) UTRAN (Universal Terrestrial Radio Access Network) system which controls the amount of data on a DCH (Dedicated Channel).

The UTRAN in the WCDMA system is a node which is positioned between a user equipment (UE) such as a mobile terminal and a core network (CN) such as an exchange network and creates an interconnection between them.

FIG. 16 shows a general structure of a UTRAN common to the prior art and the present invention. This figure shows a UTRAN 10 having a schematic structure constituted by base stations 3 and 4 (nodes B) which contain a point Uu as air (radio channel) interfaces to a UE 5 and a base station controller (Radio Network Controller: RNC) 2 which terminates a point Iu as an interface to a CN1.

An RNC contains plural nodes B through an Iub interface, to perform various processings concerning control channels (CCH) for exchanging control data, and traffic channels (TCH) for transferring user data. Of these channels, channels shared among users are called common channels, and channels individually assigned to users are called dedicated channels (DCH).

A representative function of the common channels is the function of paging. A representative function of the dedicated channels is the function of selection-synthesis/distribution to prevent an instantaneous disconnection.

In the UTRAN 10, the DCH on the point Iub as an interface between the RNC and the node B is required to operate according to specifications of Iub Frame Protocol defined in 3 GPP TS25.427 (Technical Specification Group Radio Access Network: UTRAN Iub/Iur Interface User Plane Protocol).

A difference between the uplink OCH (node B→RNC) and the downlink DCH (RNC→node B) is the degree of freedom in selecting normal mode/silent mode. That is, a provider can select the DCH mode in the uplink (UL) side. However, in the downlink (DL) side, the normal mode is indispensable to the node B in the downlink side (Air interface). Therefore, the normal mode must be selected as the mode in the downlink side in the RNC side if one should be selected from two modes of the silent mode and the normal mode.

In the normal mode, the situation of arrivals of valid data is checked for every transmission processing period, and the valid data is transmitted if there is any valid data. Otherwise, if there is no valid data, no-data frames are transmitted. In the silent mode, if there is any valid data, the valid data is transmitted. Otherwise, if there is no valid data, nothing is transmitted.

FIG. 17 shows transmission data in case of adopting the normal mode in the uplink side. If the normal mode is selected in the uplink side, the node B transmits an Iub frame to the RNC within a transmission timing interval (TTI: 10, 20, 40, and 80 ms are defined) for every user regardless whether user data is received from the UE or not.

Data which is transmitted to the RNC when user data is not received is called a no-data frame. The no-data frame does not include the user data but is provided with data concerning radio-quality like the user data.

The RNC can monitor transport-synchronization with the nodes B or the condition of the radio quality at a TTI cycle. Therefore, it is possible to perform fine controls (e.g., recovery from a synchronous error, transmission power control, and the like) in association with the nodes B. However, since frame processing inevitably takes place at the TTI cycle, heavy loads are applied to the bandwidth and the processing capability.

FIG. 18 shows transferred data when the silent mode is adopted in the uplink side. As shown in FIG. 18, when the silent mode is thus adopted in the uplink side, all the data that the RNC receives from the nodes B is user data. The nodes B do not transmit data to the RNC when the user data is not received from the UE.

In this mode, the accuracy deteriorates in the aspects of synchronous errors in transport and monitoring the radio quality, in case of a small data amount. However, if there is no data, cells (data) are not exchanged, and therefore, this mode is more advantageous than the normal mode, from the aspects of the bandwidth and the processing capability. Representative units of the cells described above are ATM (Asynchronous Transfer Mode) packets and IP (Internet Protocol) packets.

FIG. 19 shows transfer of DCH data in the downlink side. For the downlink (RNC→node B) DCH, as shown in FIG. 19, the normal mode is essential. That is, the RNC transmits user data or no-data frames to the nodes B.

Like the uplink side, if there is no valid data, frame assembly and transmission processing are carried out at defined timings in the TTI cycle, in units of users, resulting in heavy loads to the RNC and the nodes B disadvantageously from the aspect of bandwidth.

In the WCDMA system in the current situation, frames are transferred by ATM cells. Therefore, even if there is no data, the bandwidth of 53[oct]/TTI is consumed. For example, in case of TTI=10 [ms], every one user needs at least a bandwidth of 42.4 Kbps (=53[oct]×8/10 [ms]).

The system thus provides low efficiency if data is transferred in the best effort method of several Kbps. If the system is further multiplied in the future by using existing resources, it may be unavoidable to increase channels due to the problem of the bandwidth.

As described above, the conventional WCDMA UTRAN system exchanges a no-data frame at every TTI between the RNC and the nodes B in the normal mode, even when there is no user data. Heavy loads are applied to the bandwidth and the processing capability.

SUMMARY OF THE INVENTION

The present invention has been made in view of the above situation, and has an object of providing a WCDMA UTRAN system capable of effective use of the bandwidth and economisation of the processing capability of the system, by reducing cell transmission/reception processings between the RNC and the nodes B when there is no user data.

To achieve the above object, according to claim 1 of the present invention, there is provided a WCDMA UTRAN system in which a node (hereinafter referred to as node B) which communicates with a user equipment (hereinafter referred to as UE) via a point Uu and a radio network controller (hereinafter referred to as RNC) which communicates with a core network via a point Iu are connected via a point Iub, a normal or silent mode is used for a dedicated channel (hereinafter referred to as DCH) in an uplink side in a direction from the node B to the RNC, and the normal mode is used for a DCH in a downlink side in a direction from the RNC to the node B, wherein a semi-normal mode is provided in which: when a no-data frame is received from the RNC, the node B does not transmit data to the UE; when no data is received from the UE, the node B transmits a no-data frame to the RNC for every plural transmission timing intervals (hereinafter referred to as TTI); when data is not received from the node B, the RNC does not transmit data to the CN; and when data is not received from the CN, the RNC transmits a no-data frame to the node B for every plural TTIs.

According to claim 2 of the present invention, a data-non-receipt period in which the no data frame should be transmitted can be changed, based on an instruction from an upper level, in the WCDMAN UTRAN system according to claim 1.

According to claim 3 of the present invention, switching from the normal mode to the semi-normal mode is executed after the RNC makes a negotiation with the node B by a control frame, in the WCDMAN UTRAN system according to claim 1 or 2.

According to claim 4 of the present invention, the negotiation is started by an instruction from application (hereinafter referred to as APL) software in an upper level, in the WCDMAN UTRAN system according to claim 3.

According to claim 5 of the present invention, the instruction from the APL software is given based on a notification from the RNC to the APL software when a congestion is detected, in the WCDMAN UTRAN system according to claim 4.

According to claim 6 of the present invention, the RNC autonomously starts the negotiation when a congestion is detected, in the WCDMAN UTRAN system according to claim 3.

According to claim 7 of the present invention, switching from the normal mode to the semi-normal mode is performed based on a notification from the RNC to the node B when a connection is established, in the WCDMAN UTRAN system according to claim 1 or 2.

According to claim 8 of the present invention, switching from the normal mode to the semi-normal mode is performed based on an in-band notification, in the WCDMAN UTRAN system according to any one of claims 1 to 7.

According to claim 9 of the present invention, switching from the normal mode to the semi-normal mode is performed based on an out-band notification, in the WCDMAN UTRAN system according to claim 1 or 2.

According to claim 10 of the present invention, switching from the normal mode to the semi-normal mode is performed at once with respect to all connections of an opposite device, based on the out-band notification, in the WCDMAN UTRAN system according to claim 9.

According to claim 11 of the present invention, switching from the normal mode to the semi-normal mode is performed at once for every service, based on the out-band notification, in the WCDMAN UTRAN system according to claim 9.

According to claim 12 of the present invention, in the semi-normal mode, the node B integrates quality data of a period in which any no-data frame is not transmitted, and notifies the RNC of an integrated result by a next no-data frame, in the WCDMAN UTRAN system according to any one of claims 1 to 11.

According to claim 13 of the present invention, the RNC and the node B synchronously perform switching from the normal mode to the semi-normal mode, in the WCDMAN UTRAN system according to any one of claims 1 to 12.

According to claim 14 of the present invention, the RNC and the node B asynchronously perform switching from the normal mode to the semi-normal mode, in the WCDMAN UTRAN system according to any one of claims 1 to 12.

According to claim 15 of the present invention, the asynchronous switching is performed, triggered by a receipt of a control frame, in the WCDMAN UTRAN system according to claim 14.

According to claim 16 of the present invention, there is provided a WCDMA UTRAN system in which a node B which communicates with a UE via a point Uu and an RNC which communicates with a CN via a point Iu are connected via a point Iub, a normal or silent mode is used for a DCH in an uplink side in a direction from the node B to the RNC, and the normal mode is used for a DCH in a downlink side in a direction from the RNC to the node B, wherein a fast or slow TTI is selected depending on whether a load is light or heavy.

BRIEF DESCRIPTION OF THE DRAWINGS

FIG. 7 is a chart showing an in-band second mode switching image;

FIG. 8 shows an operation image in case of asynchronous switching;

DETAILED DESCRIPTION OF THE PREFERRED EMBODIMENTS

Embodiments of the present invention will now be described with reference to the drawings. The description will be made specifically.

First Embodiment

Figure 1:
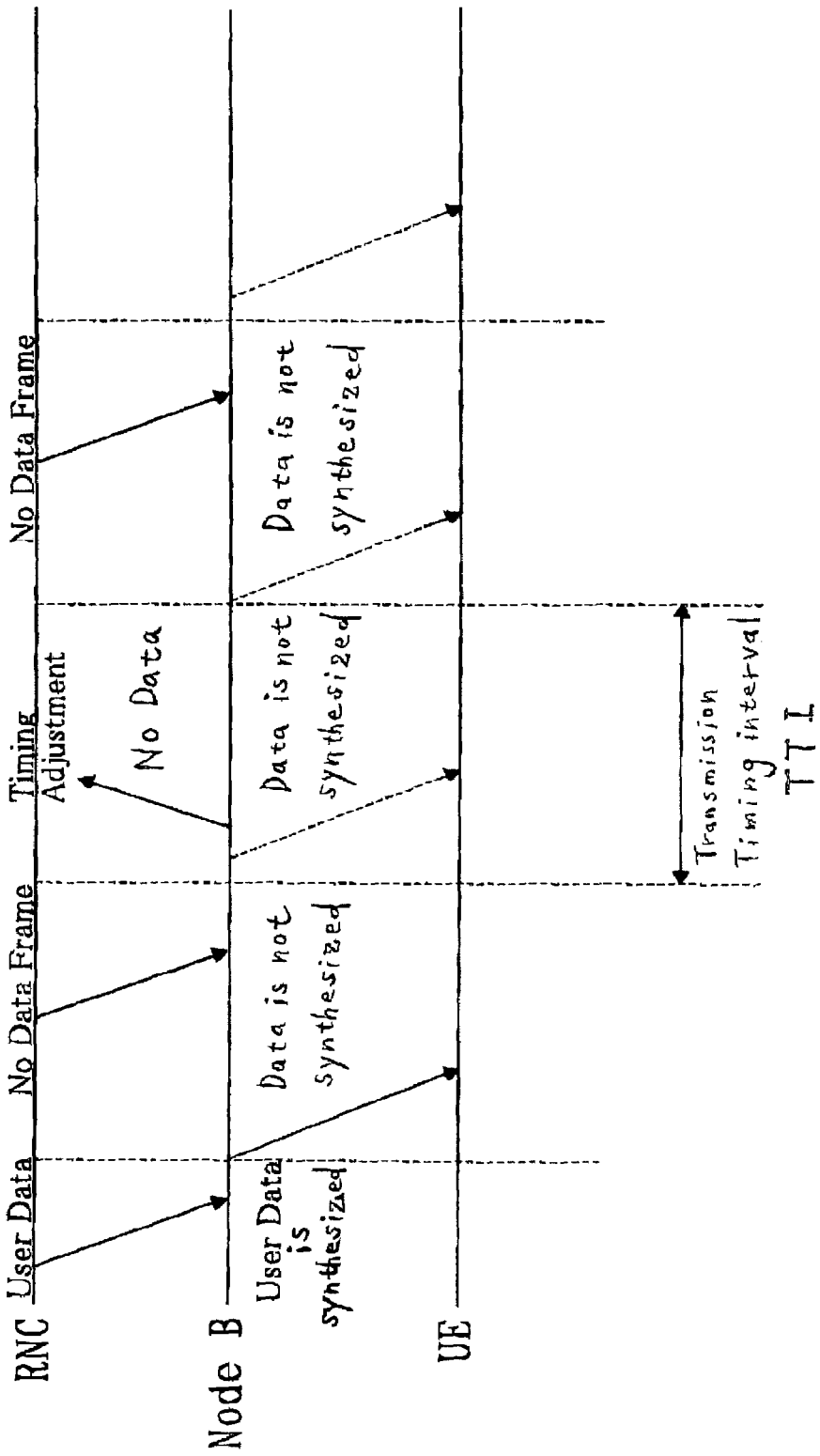
FIG. 1 is a chart explaining a first operation example of a node B in a WCDMA UTRAN system according to the first embodiment of the present invention.
Figure 2:
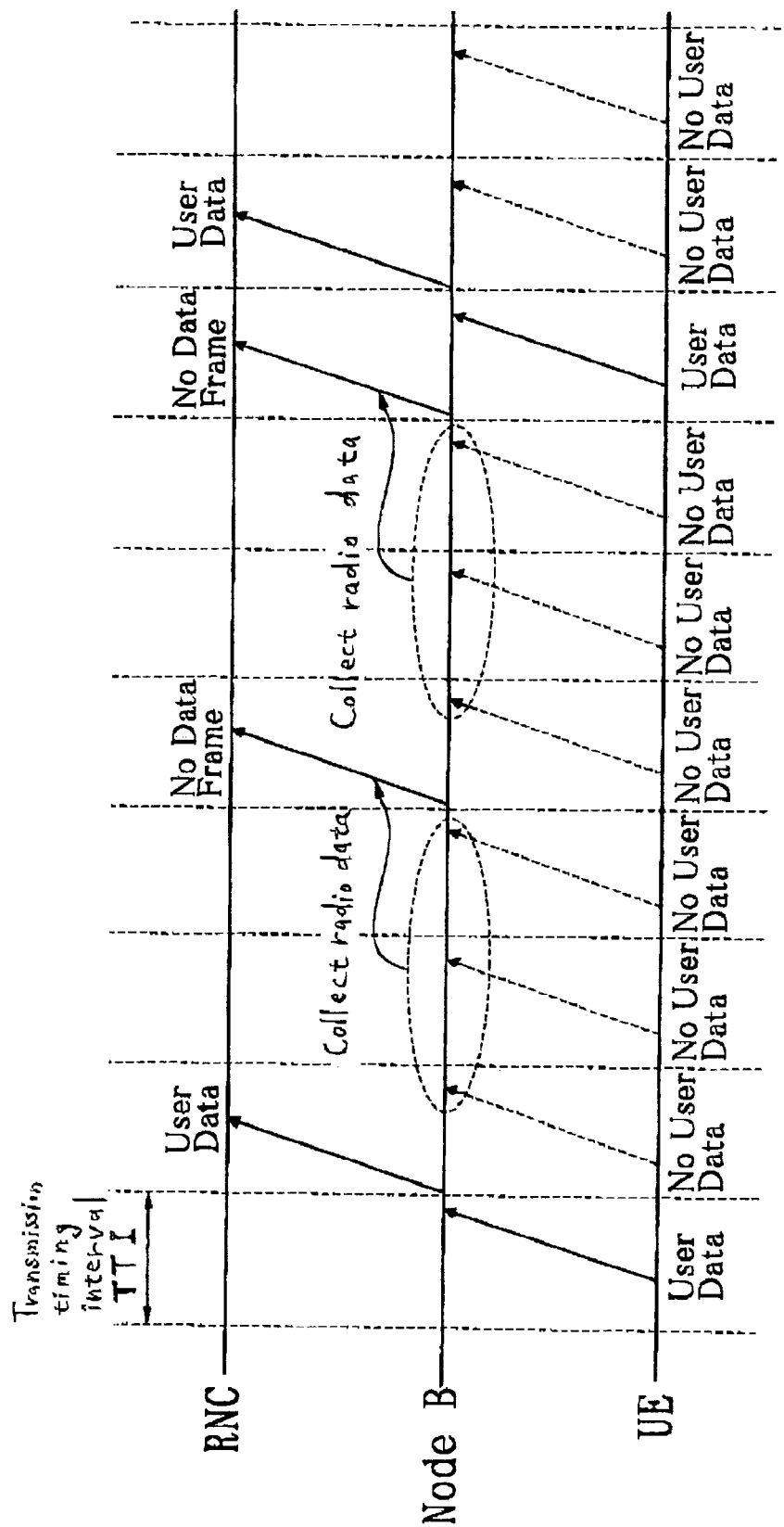
FIG. 2 is a chart explaining a second operation example of the node B in the WCDMA UTRAN system according to the first embodiment of the present invention.
Figure 3:
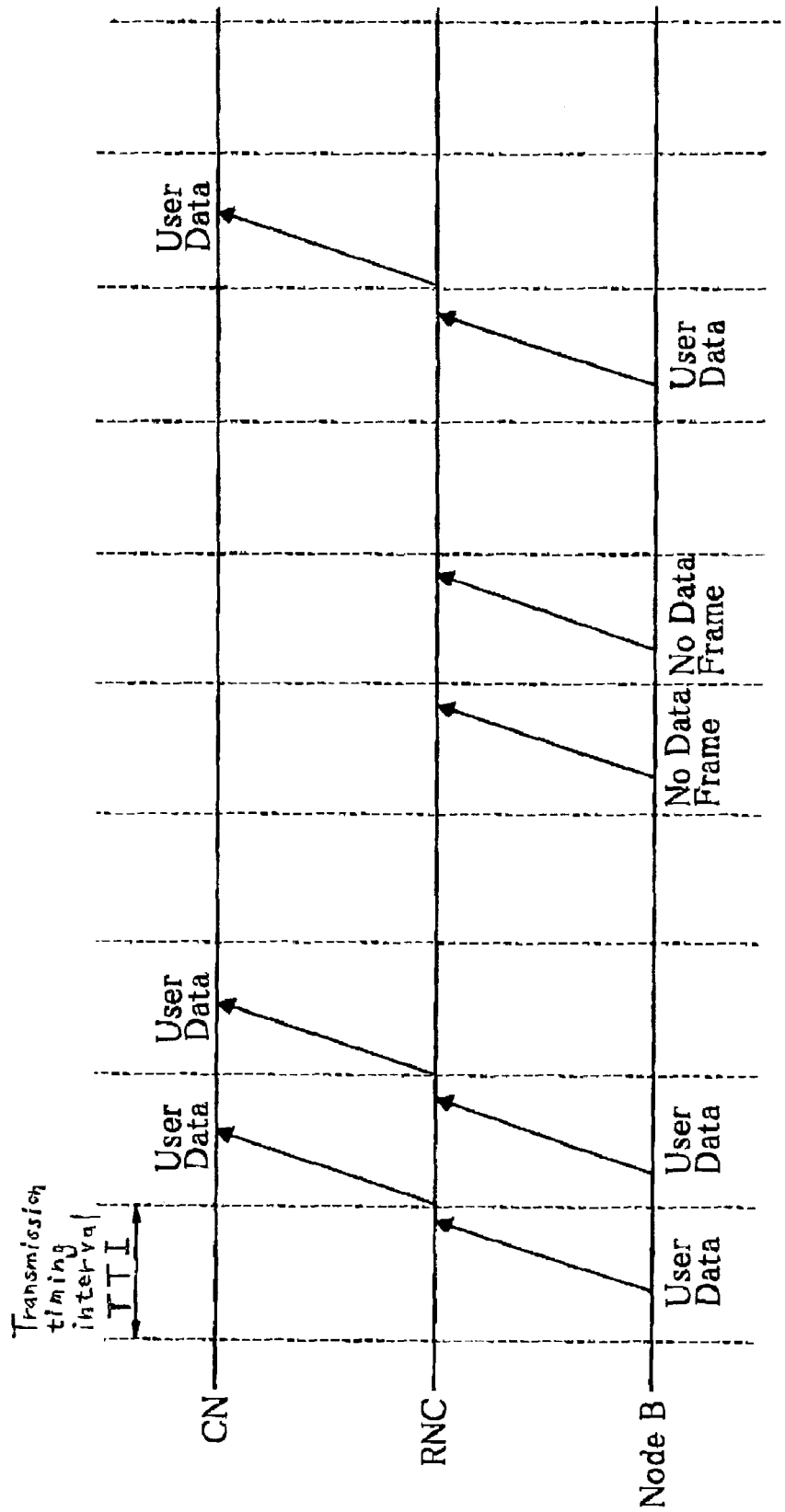
FIG. 3 is a chart explaining a first operation example of an RNC in the WCDMA UTRAN system according to the first embodiment of the present invention.
Figure 4:
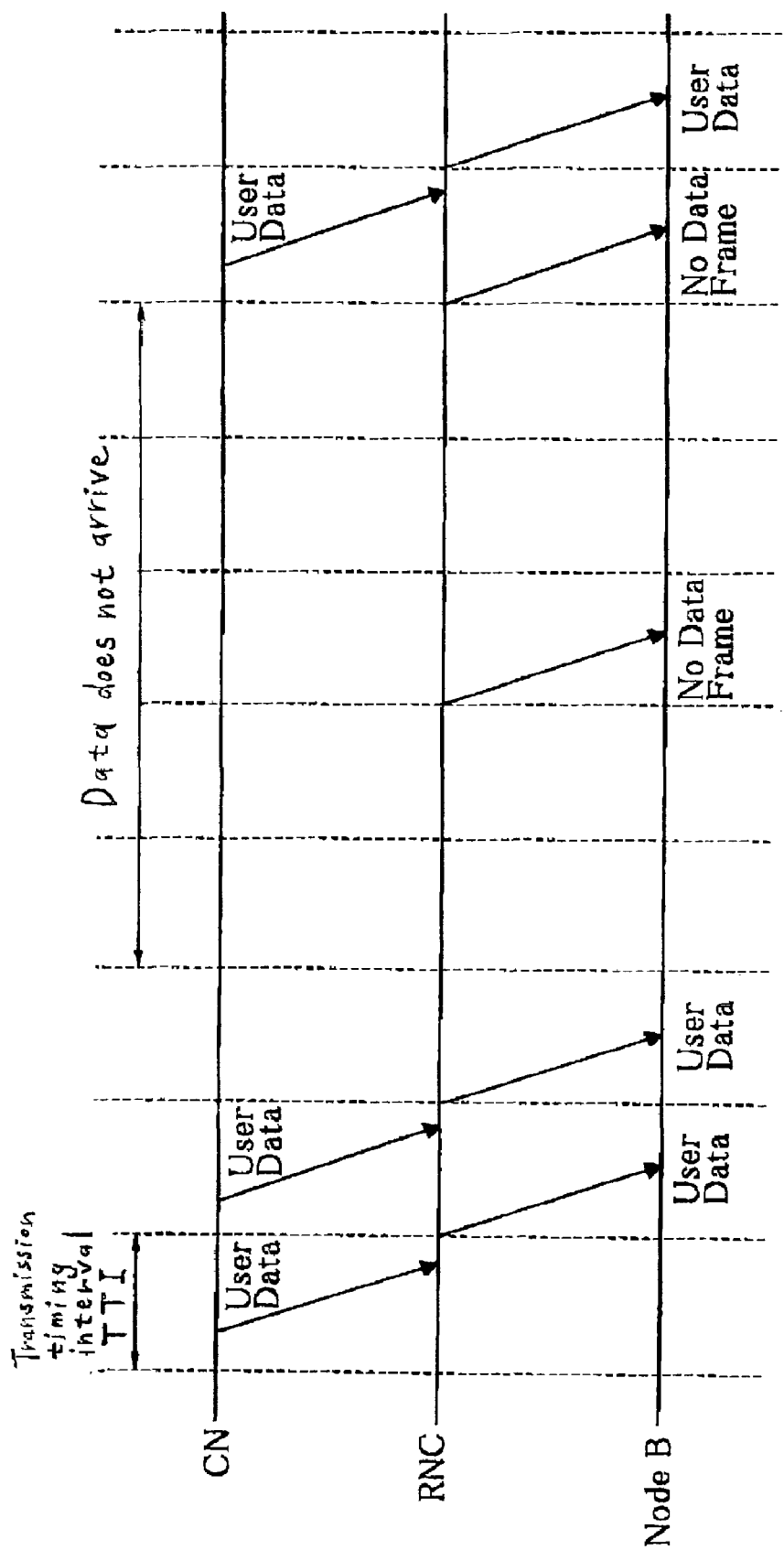
FIG. 4 is a chart explaining a second operation example of the RNC in the WCDMA UTRAN system according to the first embodiment of the present invention.
Figure 5:
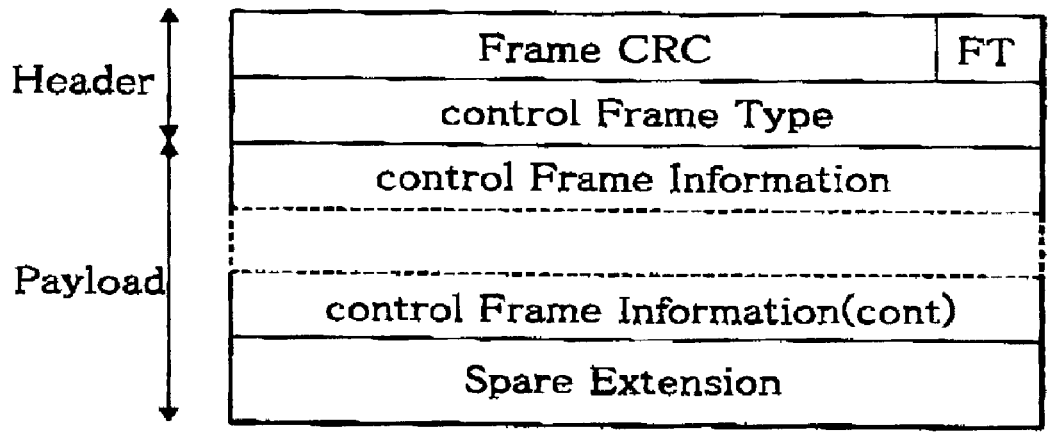
FIG. 5 shows an example of format of a mode-switching acknowledgement frame.
Figure 6:
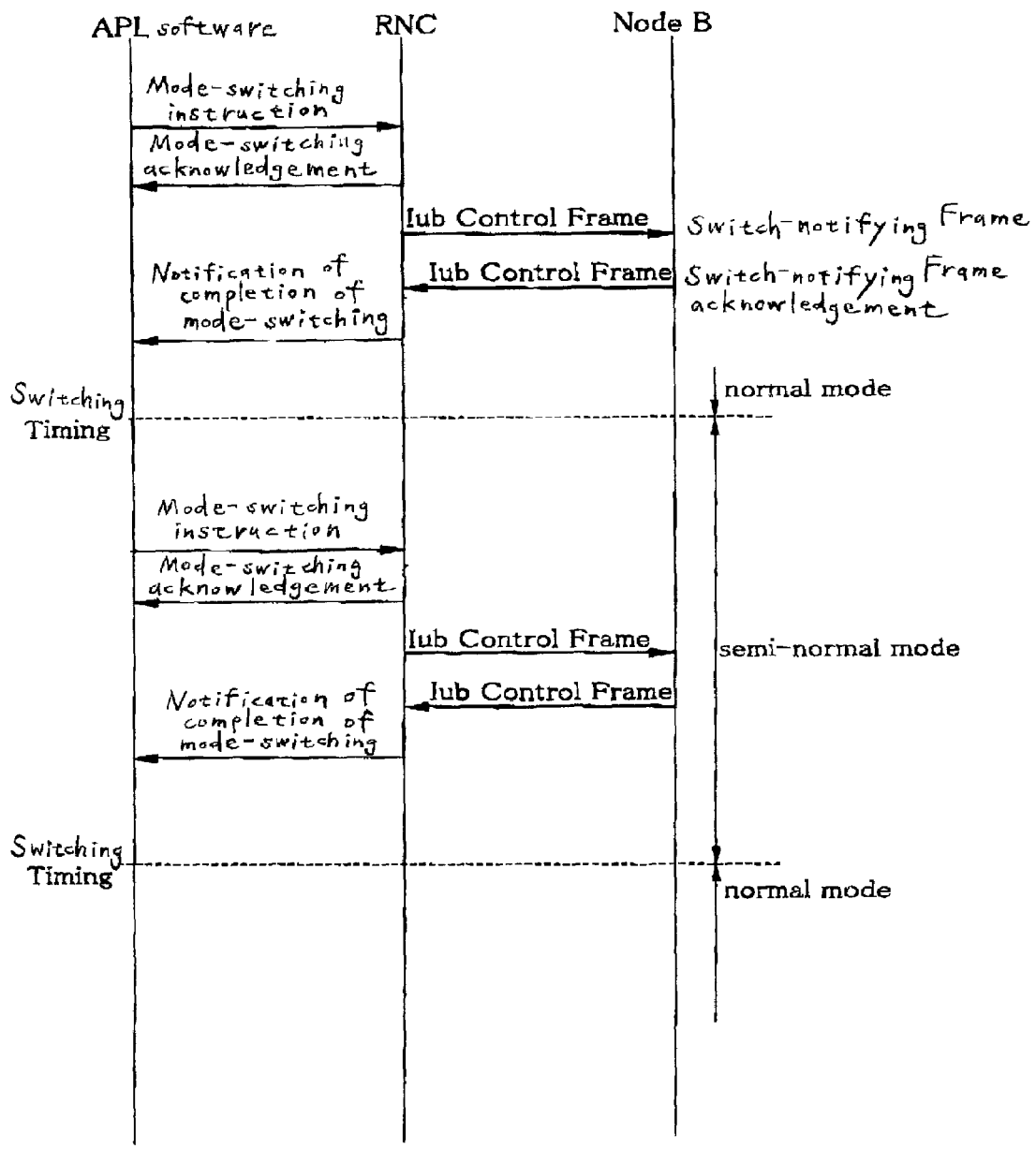
FIG. 6 is a chart showing an in-band first mode switching image.
Figure 9:
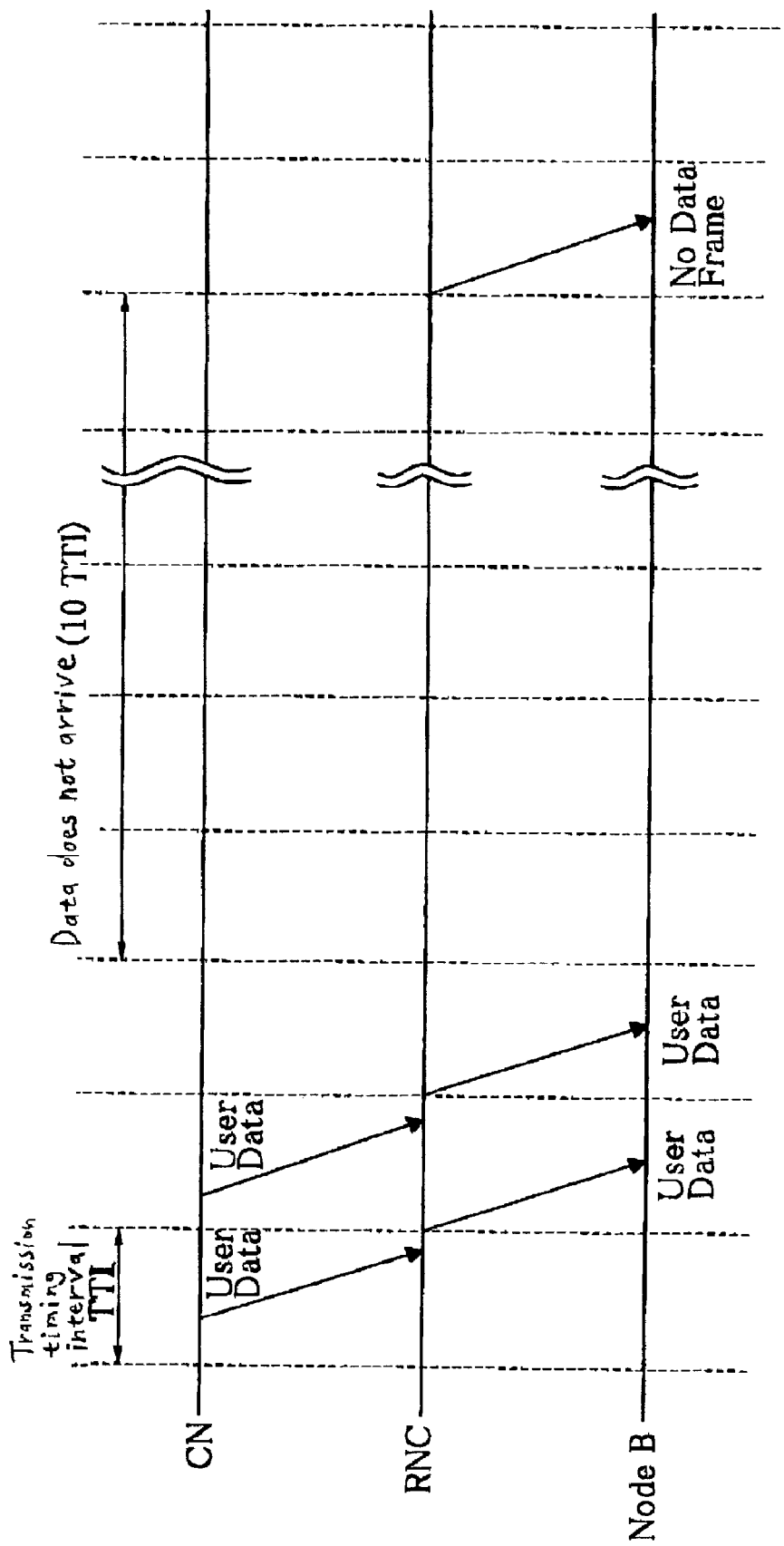
FIG. 9 shows an operation image in case where the transmission timing interval of no-data frame is long.
Figure 10:
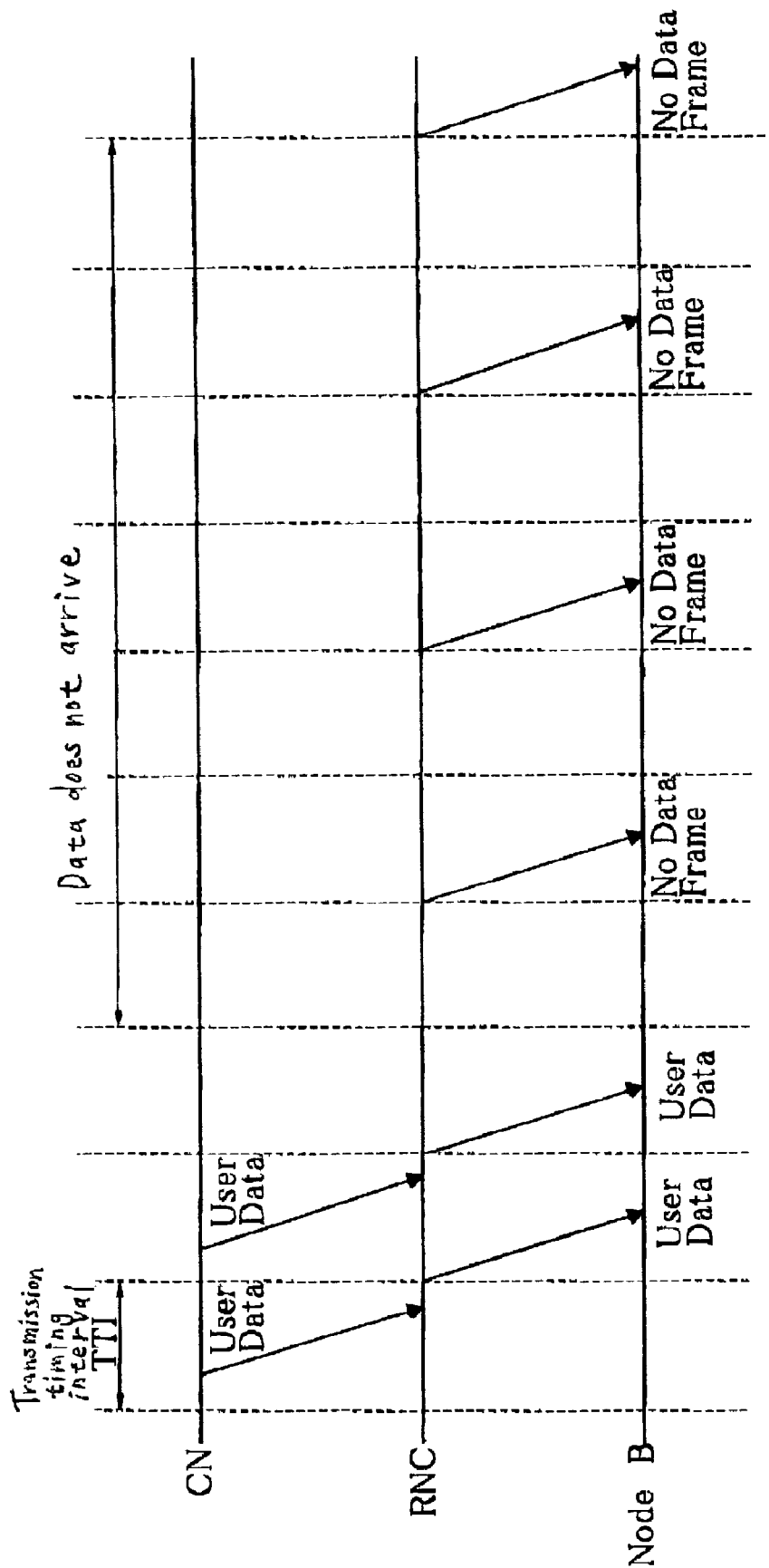
FIG. 10 shows an operation image in case where the transmission timing interval of no-data frame is short.
Figure 11:
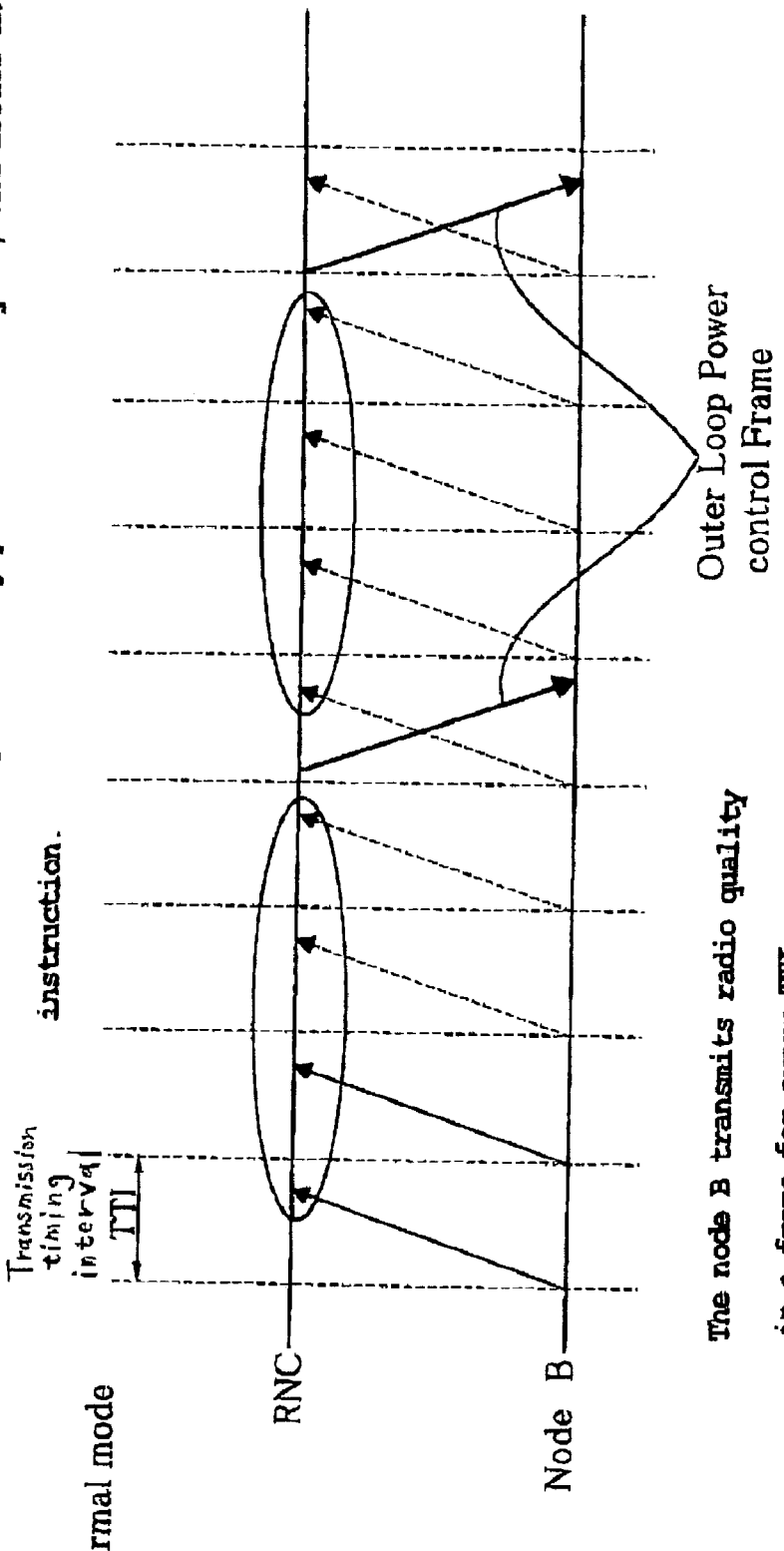
FIG. 11 is a chart showing an example of a method of collecting quality data in the uplink direction in the normal mode.
Figure 12:
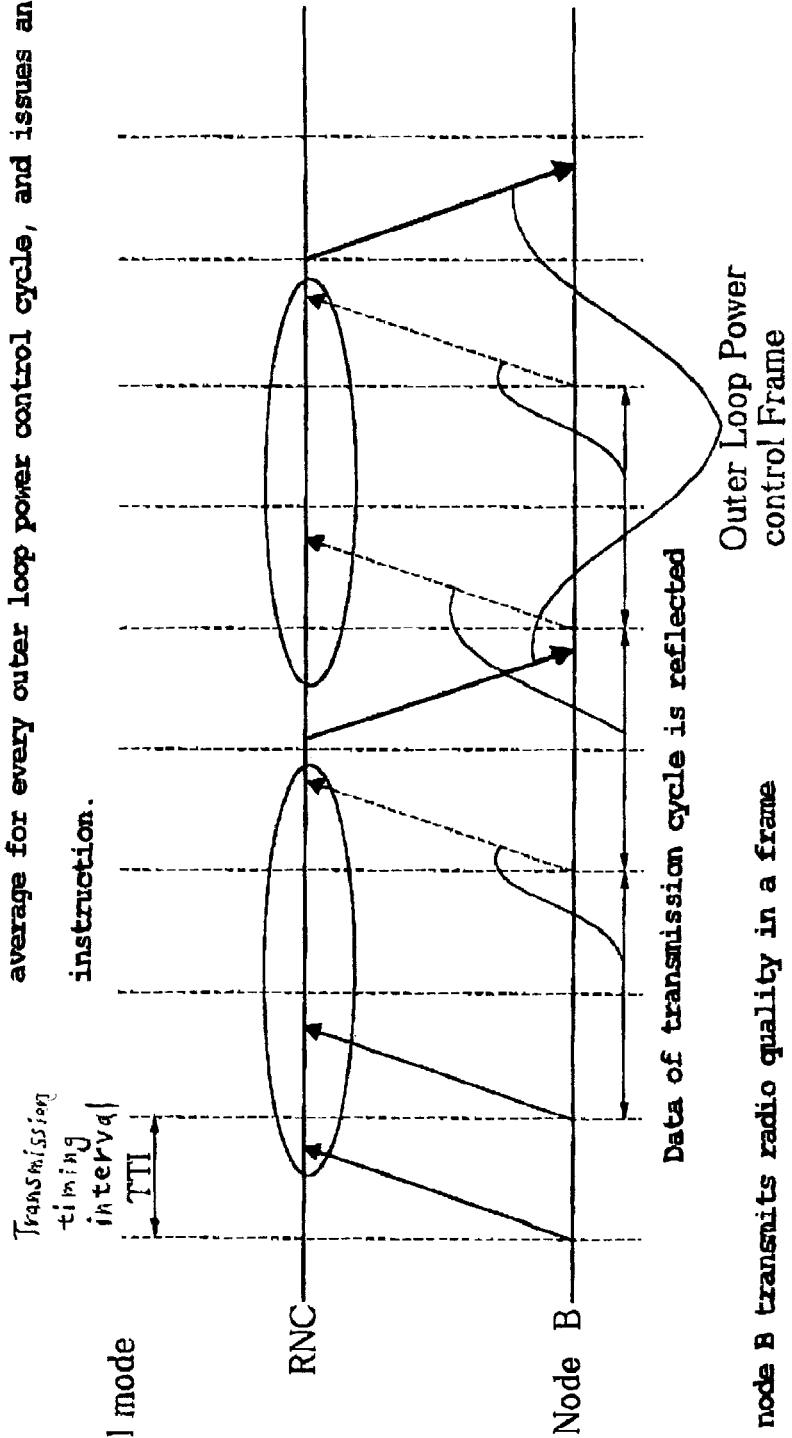
FIG. 12 is a chart showing an example of a method of collecting quality data in the uplink direction in the semi-normal mode.

FIG. 1 is a chart explaining a first operation example of a node B in a WCDMA UTRAN system according to the first embodiment of the present invention. FIG. 2 is a chart explaining a second operation example of the node B in the WCDMA UTRAN system according to the first embodiment of the present invention. FIG. 3 is a chart explaining a first operation example of an RNC in the WCDMA UTRAN system according to the first embodiment of the present invention. FIG. 4 is a chart explaining a second operation example of the RNC in the WCDMA UTRAN system according to the first embodiment of the present invention. FIG. 5 shows an example of format of a mode-switching acknowledgement frame. FIG. 6 is a chart showing an in-band first mode switching image. FIG. 7 is a chart showing an in-band second mode switching image. FIG. 8 shows an operation image in case of asynchronous switching. FIG. 9 shows an operation image in case where the transmission timing interval of no-data frame is long. FIG. 10 shows an operation image in case where the transmission timing interval of no-data frame is short. FIG. 11 is a chart showing an example of a method of collecting quality data in the uplink direction in the normal mode. FIG. 12 is a chart showing an example of a method of collecting quality data in the uplink direction in the semi-normal mode.

Figure 16:
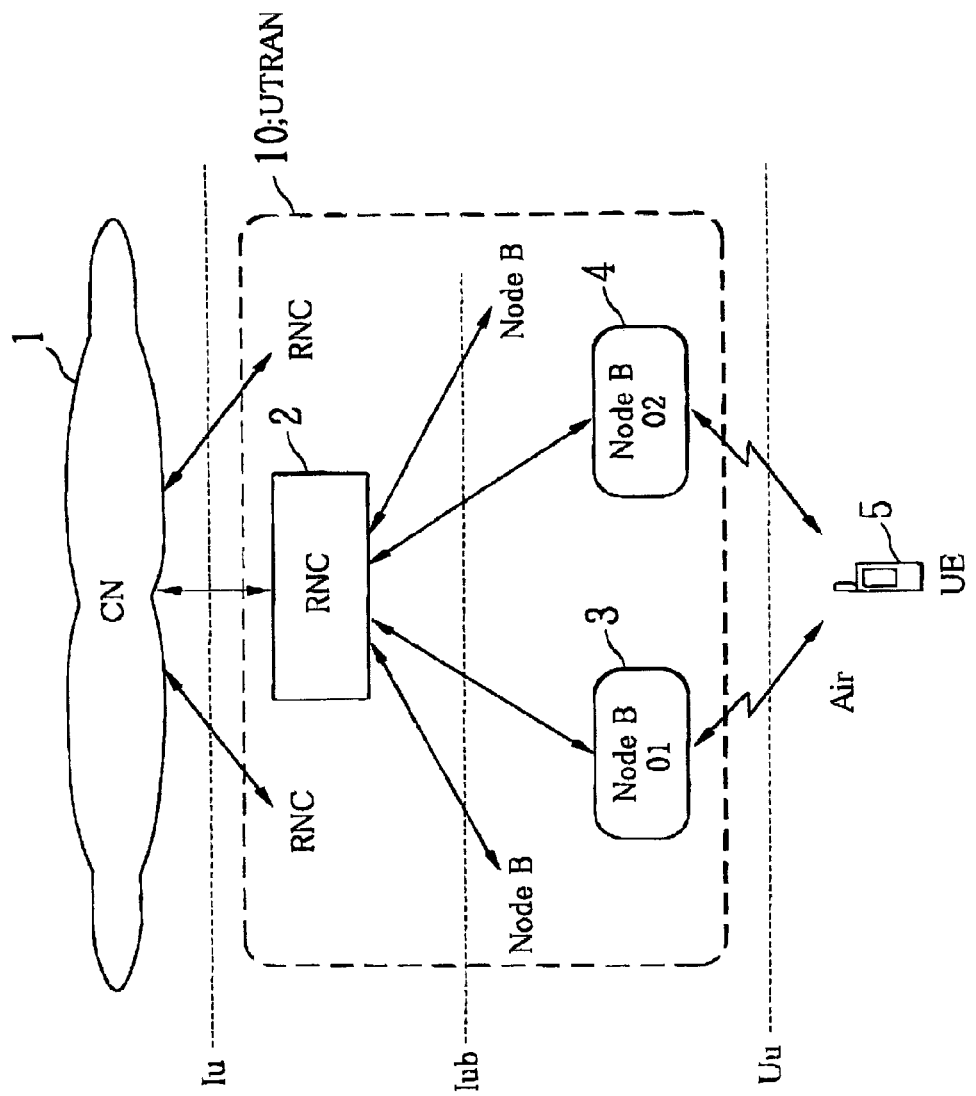
FIG. 16 shows a general structure of a UTRAN common to the prior art and the present invention.
Figure 17:
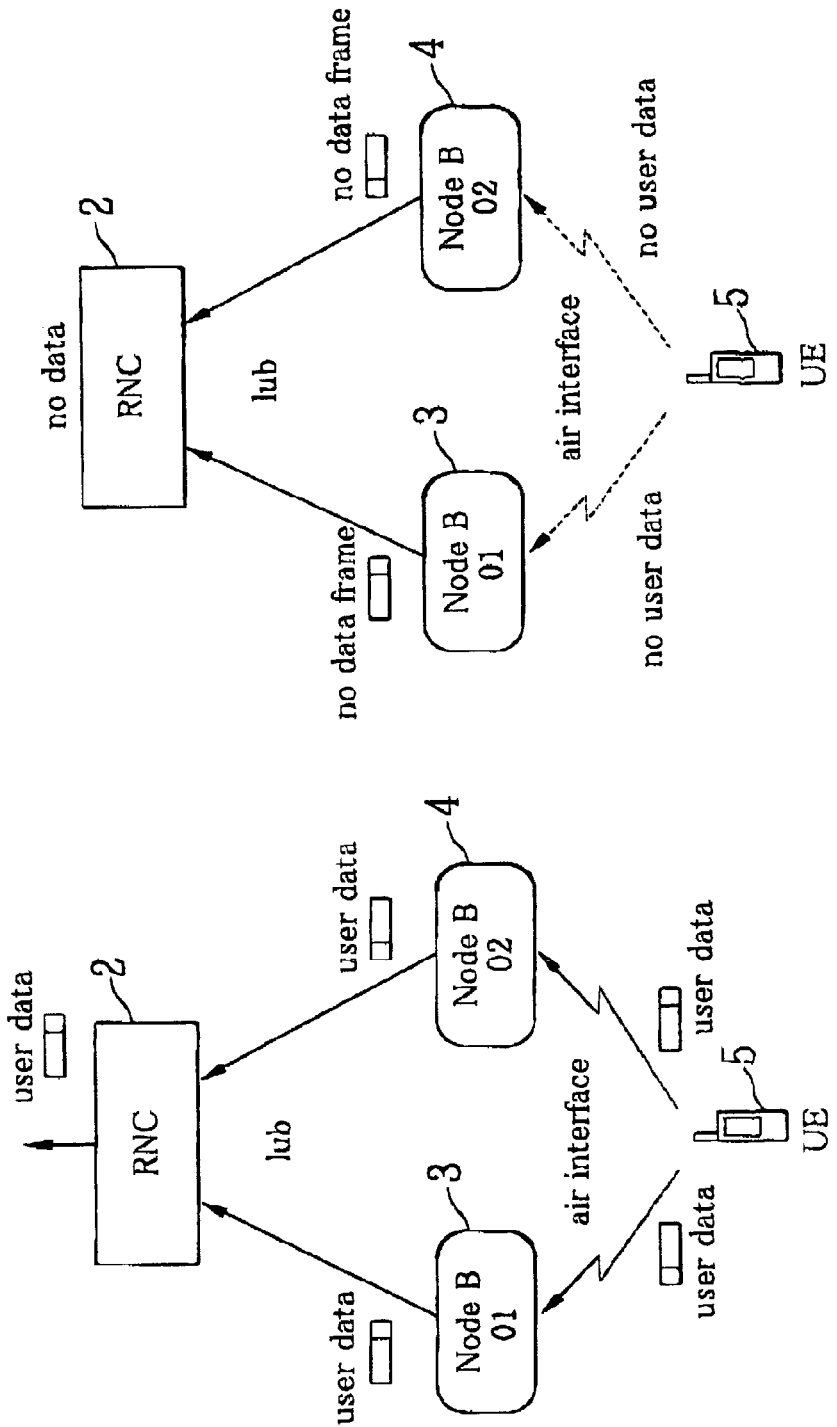
FIG. 17 shows transferred data when the normal mode is adopted in the uplink side DCH.
Figure 18:
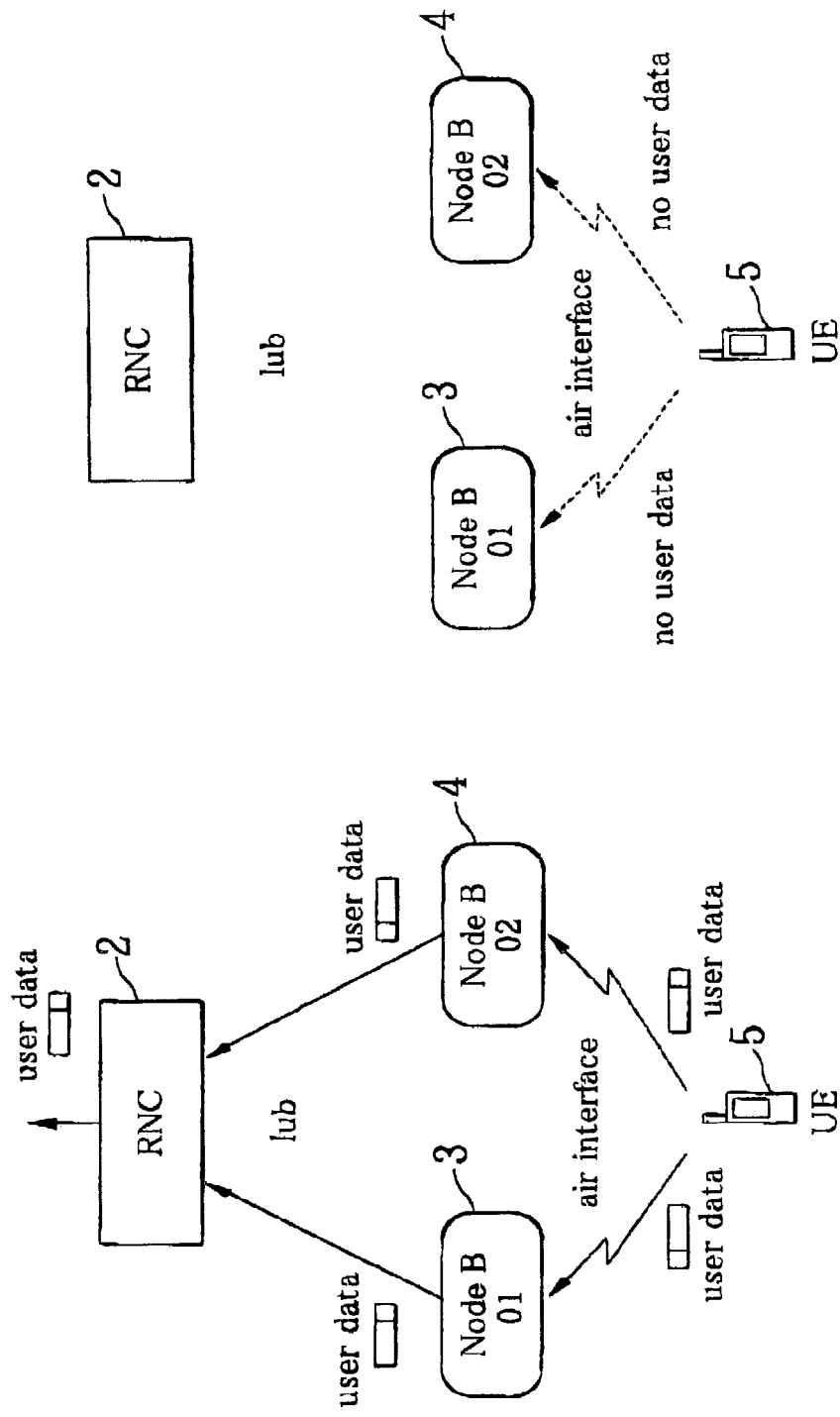
FIG. 18 shows transferred data when the silent mode is adopted in the uplink side DCH.
Figure 19:
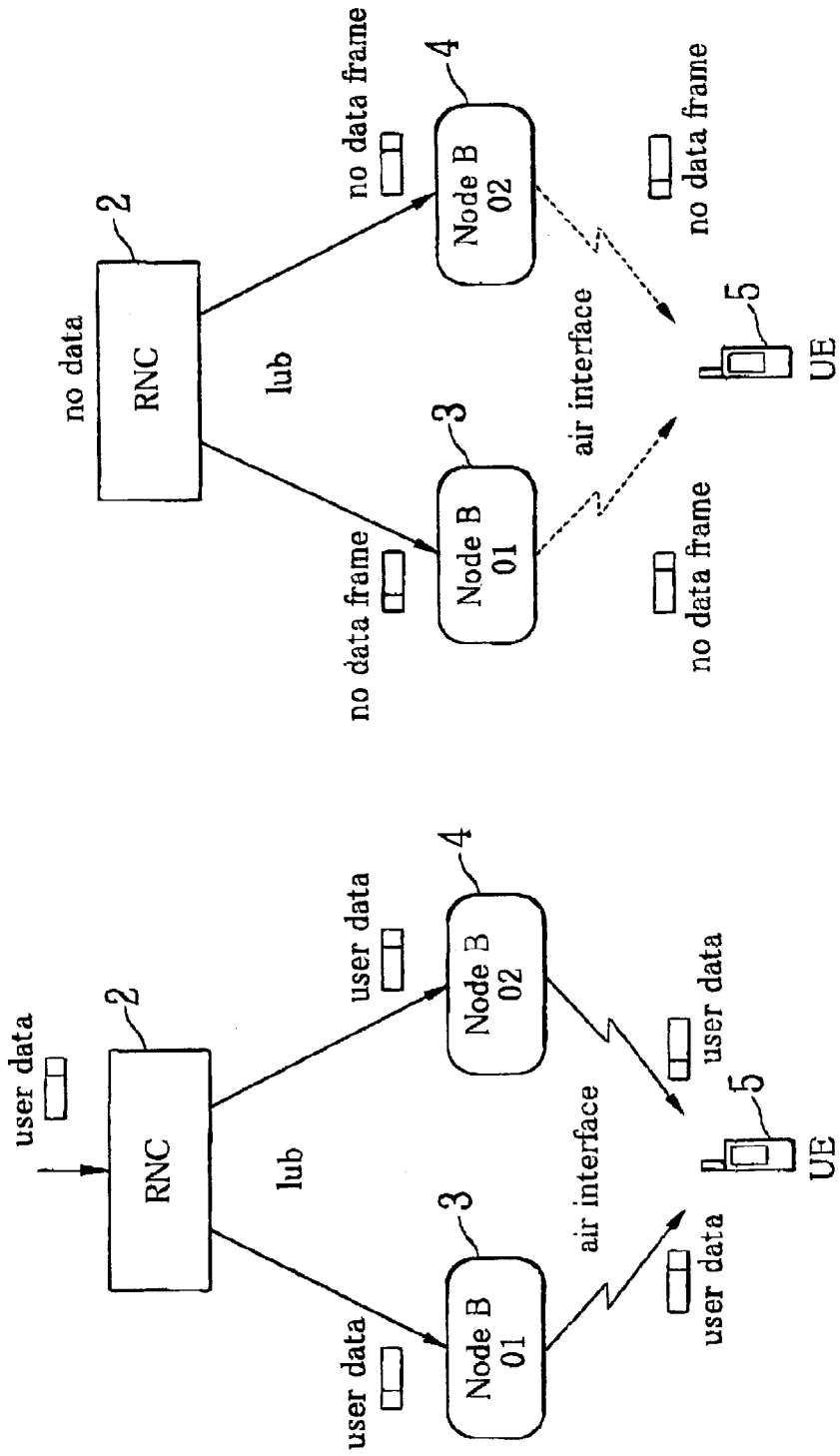
FIG. 19 shows transfer of DCH data in the downlink side.

The structure of the UTRAN in the WCDMA UTRAN system according to the present embodiment is the same as the prior art example shown in FIG. 16.

The UTRAN 10 according to the present embodiment has the structure shown in FIG. 16 and is constituted by nodes B3 and B4 and an RNC 2, which support the normal mode and the silent mode in the uplink (UL) side and the normal mode in the downlink (DL) side. Part (or all) of the nodes B3 and B4 and the RNC supports the semi-normal mode.

Note that the semi-normal mode has an intermediate characteristic between the normal mode and the silent mode. In this mode, the arrival situation of valid data is checked for every transmission processing period. If there is any valid data that has arrived, the valid data is transmitted out. Alternatively, if a situation that there is no valid data continues, a no-data frame is transmitted for every predetermined interval.

The UTRAN 10 communicates with a UE 5 such as a portable terminal via a point Uu (air) as well as a CN 1 such as an exchanger via a point Iu. The RNC2 and nodes B3 and B4 which support the semi-normal mode executes mode-switching (between the normal mode and the silent mode) in accordance with reception of a control frame, an instruction (C-plane) from control (application: APL) software, an independence or other external factors, or a combination thereof. Each node of the UTRAN 10 performs the following operation in the semi-normal mode.

Operation of the node B (semi-normal mode)

FIG. 1 explains the operation of the node B in the case of transfer in the direction of RNC→node B→UE.

When a no-data frame is received from the RNC in the semi-normal mode, processing for normal transport synchronization such as timing adjustment or the like is executed, as shown in FIG. 1, the reception of the no-data frame is not reflected on the Air (UE).

FIG. 2 explains the operation of the node B in the case of transfer in the direction of UE→node B→RNC.

In the semi-normal mode, no-data frame is transmitted to the RNC only when the node B continues receiving no data from the UE for a predetermined period (3TTI in FIG. 2).

At this time, it may be possible to provide a means for monitoring the radio quality data during the period of receiving no data, due to the outer loop power control, and reflecting the result of the monitoring on the no-data frame. For example, it is possible to adopt a method in which a QE value (which is a field indicative of a bit error rate of the radio section) given to the no-data frame is set at an average value of the period.

In this case, the number of transmitted no-data frames in the transmission cycle is not limited to one but may be changed by setting from an upper level. Also, this mode can be set (executed) independently in the direction of RNC→node B (downlink) and in the direction of node B→RNC (uplink), including parameters such as cycles and the like.

Setting of the number of no-data frames to be transmitted in the transmission cycle is carried out generally based on instructions from an upper level, not only in the case of the outer loop power control but also in the semi-normal mode. At this time, instructions may not be always necessary.

The outer loop power control described above means a transmission power control method as follows. That is, the RNC and the UE measure the communication quality of a long section and set an aimed SIR (Signal to Interference Ratio) of the received signal, so that the communication quality BER (Bit Error Rate) or BLER (Block Error Rate) reaches a certain aimed value. Further, a command for changing up or down the transmission signal level is transmitted to the other side, so that the SIR of the received signal reaches the aimed SIR. The receiving side performs control of increasing and decreasing the transmission power alternately at a predetermined cycle, to attain proper signal quality and to prevent increase of interference with other stations.

Operation of the RNC (Semi-Normal Mode)

FIG. 3 explains the operation of the RNC in the case of transfer in the direction of node B→RNC→CN.

In the semi-normal mode, no-data frames received from the node B is subjected to the same processing as that in the silent mode, as shown in FIG. 3. However, if a no-data frame arrives, radio quality data and the like are collected like in the normal mode, while data is not transmitted to the side of the Iu.

FIG. 4 explains the operation of the RNC in the case of transfer in the direction of CN→RNC→Node B.

Transmission of no-data frames in the direction of RNC→Node B is carried out when the period in which user data is not received from the side of the Iu continues a specified period (3TTI in FIG. 4).

With reference to FIGS. 1 to 12 and FIG. 16, the operation of the WCDMA UTRAN system in this embodiment will be explained hereinafter.

FIG. 5 shows an example of format of a mode-switching acknowledgement frame.

In this example, each of the RNC and node B is let have a function to exchange data frames for switching between the normal mode and the semi-normal mode, in an in-band manner (on the same connection as that of the user data).

It is considered that an existing control frame format exchanged on the Iub may be used as the data frame for switching modes in this case, as shown in FIG. 5.

In FIG. 5, the frame CRC specifies a CRC (Cyclic Redundancy Check) code to detect an error for every frame. The reference symbol FT denotes the frame type. "0" denotes a data frame and "1" denotes a control frame. As shown in the figure, types "0" to "9" are defined as control frames.

For example, when a mode-switching instruction is received from APL software in the upper level, the RNC issues a mode-switching acknowledgement (DL mode-switching acknowledgement) to the node B which the RNC communicates with, as shown in FIG. 5.

Upon receipt of this acknowledgement, the node B replies to the acknowledgement, and executes switching from the normal mode to the semi-normal mode at the timing of the acknowledged data.

FIGS. 6 and 7 show images of in-band mode-switching. FIG. 6 shows only triggers in the in-band mode-switching operation. FIG. 7 shows the in-band mode-switching operation in case of including user plane (U-plane) data.

FIG. 6 shows a method in which the node B and the RNC switch modes in synchronization with each other at defined timings. Of courses the modes may be switched without synchronization between the node B and the RNC.

FIG. 8 shows an example of mode-switching without synchronization. ①  to ⑧ show orderly switching operations performed by the RNC and the node B.

If receipts of control frames are taken as triggers to make the mode transit sequentially, as shown in FIG. 8, complicated timing controls are not necessitated.

In FIG. 8, the modes are switched at once both in the uplink side (node B→RNC) and the downlink side (RNC→node B).

If the downlink (DL) is specified when the normal mode is switched to the semi-normal mode and if no cell arrives, the node B operates not to transmit the valid data to the Air. That is, even when a no-data frame is received, only the control synchronized with the RNC is made operate, and nothing is reflected on the data format of the Air. Like the prior art example, however, the no-data frame may be considered to have arrived and may be reflected on the data format of the Air, even if any no-data frame has not arrived.

The RNC also switches the normal mode to the semi-normal mode at a defined timing and restricts the no-data frame in the direction of RNC→node B while user data is not received from the CN.

In this case, the method of restricting the no-data frame may be defined from every type of service by the provider.

For example, a packet call or the like represented by I-mode is the Best Effort type, i.e., a type of communication service which does not always guarantee usable communication transfer bands for users when the network is crowded. In this type, the traffic normally tends to burst and a function of retransmission is provided. It is hence considered that a restriction instruction of a type in which no-data frames are hardly transmitted may be applied.

FIG. 9 shows an example of transmitting a no-data frame in case where the transmission timing interval of no-data frame is long. For example, as shown in FIG. 9, the no-data frame may be transmitted only for every cycle of TTI×α.

If α is infinite, i.e., if there is no data, the cycle is equal to the silent mode. Therefore, most of the band between the RNC and the node B (RNC→node B) is not substantially consumed.

Dedicated control cannels (DCCH) as control channels assigned respectively to individual users have a function of retransmission in the RLC (Radio Link Control) layer level, like packets. There may be choices, e.g., mode-switching is not carried out to prevent delays or the like during connections or a control close to the normal mode is instructed.

FIG. 10 shows an image when the cycle of the no-data frame is short in case where the control close to the normal mode is carried out.

FIG. 10 shows an example in case where a no-data frame is transmitted for every 2TTI.

Even when there is no data, the band between the RNC and the node B (RNC→node B) is consumed. However, since the transport cycle is monitored at a short cycle, it is possible to improve responsibility in recovery from a synchronous error.

The selection of the transmission cycle setting mode for no-data frames as described above depends greatly on where in services such as fees, reliability, and the like importance should be taken. Therefore, it may be better to determine the mode not uniquely. It is therefore desired that various patterns of no-data frame transmission control means should be included in the specifications of the device.

The method according to this example is applicable not only to the downlink side but also to the uplink side. In addition, various traffic patterns can be considered for the no-data frame, depending on various intensions. For example, there may be a method of increasing the foregoing value of α for every transmission/reception of a no-data frame.

FIGS. 11 and 12 show schematic images of a quality data collection method in the uplink direction. FIG. 11 shows the method in the normal mode. FIG. 12 show the method in the semi-normal mode.

To perform power control such as an outer loop or the like in the normal mode, the node B transmits the radio quality in a frame for every TTI, as shown in FIG. 11. The RNC totals the radio quality data of all frames, calculates an average or the like for every cycle of the outer loop power control, and issues an instruction.

Alternatively, in case of performing power control such as an outer loop or the like in the semi-normal mode, the node B integrates the quality data during periods in which any no-data frame is not transmitted, transmits the radio quality in a frame for every transmission of a frame. The RNC totals the radio quality data of all frames, calculates an average or the like for every cycle of the outer loop power control, and issues an instruction. Thus, power control which is equal to that in the normal mode can be realized.

Thus, in the WCDMA UTRAN system according to the present embodiment, cell transmission/reception processings at the node B and the RNC are reduced in case where there is no user data. Therefore, resources for the reduced part of the processings can be used to process other user data Accordingly, more multiplication and economization can be achieved easily in the WCDMA UTRAN system.

Also, the possibility that only the user data flows through channels is increased. Therefore, there are advantages in that the channel band can be used more effectively, delays can be prevented from occurring, and the multiplication can be improved.

In addition, differentiation of the channel quality can be defined more clearly by restricting the transmission/reception of no-data frames. Accordingly, well-organized prices can be set compared with the case of standard specifications.

Further, transmissions/receptions of no-data frames are reduced, so that the power consumption of the entire system can be saved more than in a system which does not adopt the method of the present invention, under equal conditions. As a result, it is expected that the lifetime of the device can be elongated.

Since unnecessary cells in the UTRAN can be decreased or reduced to zero, precision in traffic collection can be improved.

Second Embodiment

In the method according to the first embodiment, a negotiation is made between nodes by a control frame and then the modes are switched, assuming that there is a node which is not compatible with the semi-normal mode.

This is because a case of existence of a node which does not deals with the semi-normal mode is assumed. For example, an existing node B does not support a new control frame, and therefore cannot reply to a mode-switching request. In this manner, the system can recognize that the node is not compatible with the semi-normal mode and can stop the mode-switching.

However, if all nodes in the UTRAN are compatible with both of the semi-normal mode and the normal mode, there can be a method in which the negotiation is omitted and communication is made in an intended mode from when a connection is made. For example, the semi-normal mode or normal mode may be specified from the start to the end of a call.

FIG. 13 shows an example of the method of specifying a mode when a connection is set, compared with the case of using a control frame.

Figure 13A:
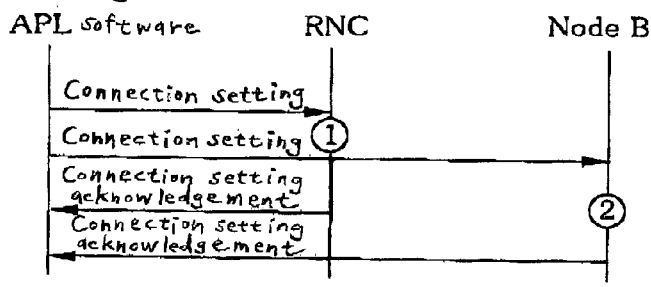
FIG. 13 shows an example of the method of specifying a mode when a connection is set, in a WCDMA UTRAN system according to the second embodiment of the present invention.
Figure 13B:
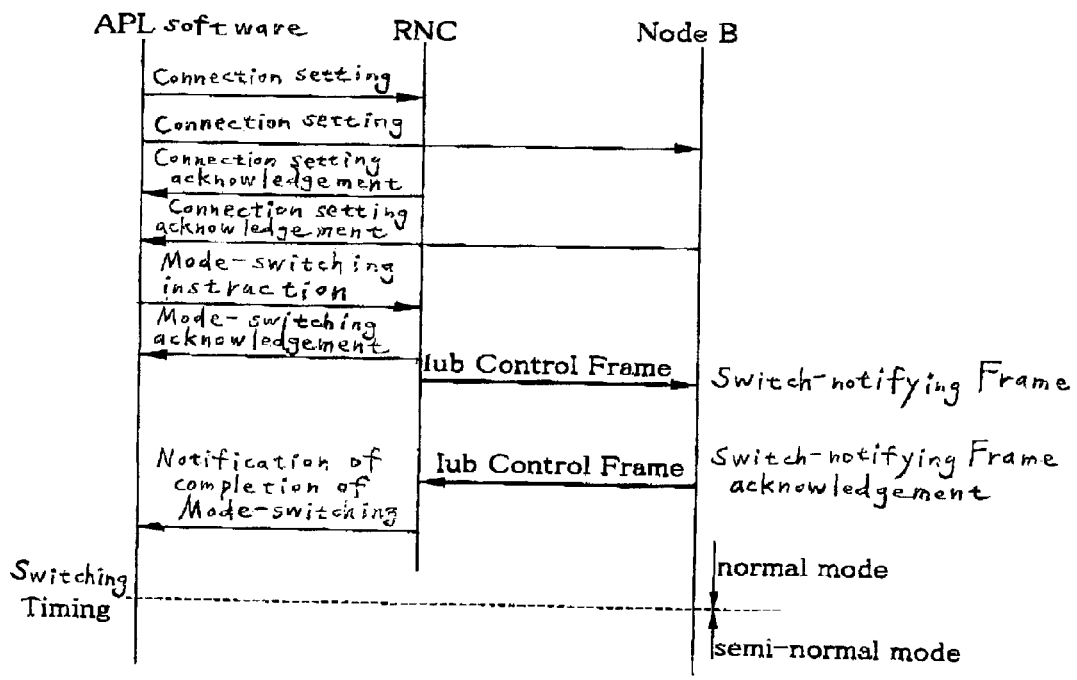

FIG. 13A shows a case where a mode is specified when a connection is set. ① and ② respectively show startup of the RNC and the node B in the semi-normal mode. In contrast, FIG. 13B shows a case where a control frame is used to perform mode-switching.

Thus, the WCDMA UTRAN system according to the present embodiment achieves the same advantages as those of the first embodiment, and can omit unnecessary control frames and instruction primitives. Therefore, loads to the system can be reduced more than in the first embodiment.

Third Embodiment

In the WCDMA UTRAN system according to the present embodiment, the device independently makes a negotiation based on control frames as shown in FIG. 6, to perform switching between the semi-normal mode and the normal mode, without inserting APL software.

In the method of this embodiment, the device transmits, by itself, a control frame to an opposite node and switches the opposite node into the semi-normal mode, so that user frames might not drop when it is determined to be congested or nearly congested by a congestion detection determination function which is normally provided for the device. When the congested state is released or the like, the semi-normal mode is switched back again to the normal mode.

Figure 14:
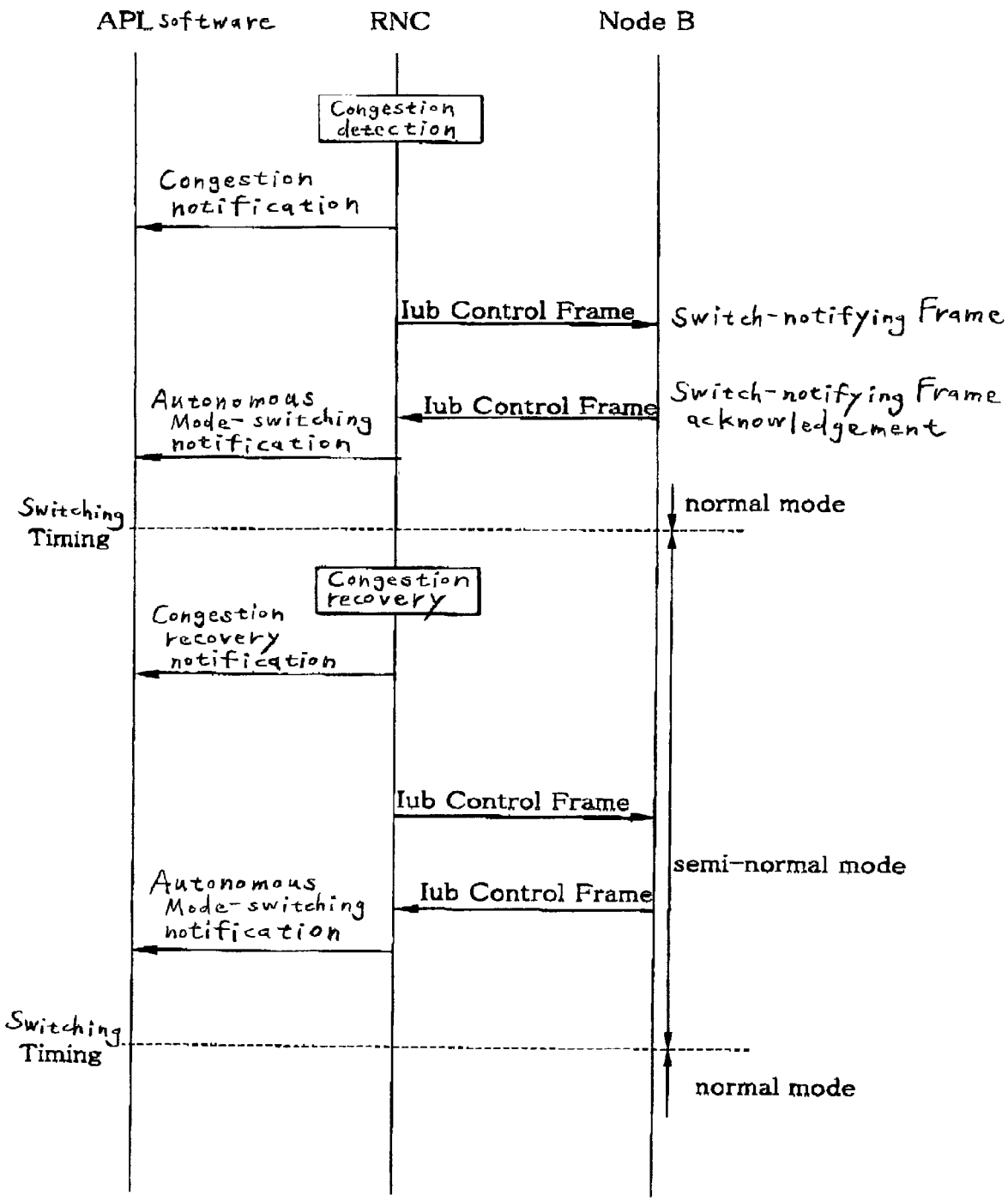
FIG. 14 shows a first example of the method in which the device automatically performs mode-switching when a congestion occurs in a WCDMA UTRAN system according to the third embodiment of the present invention.
Figure 15:
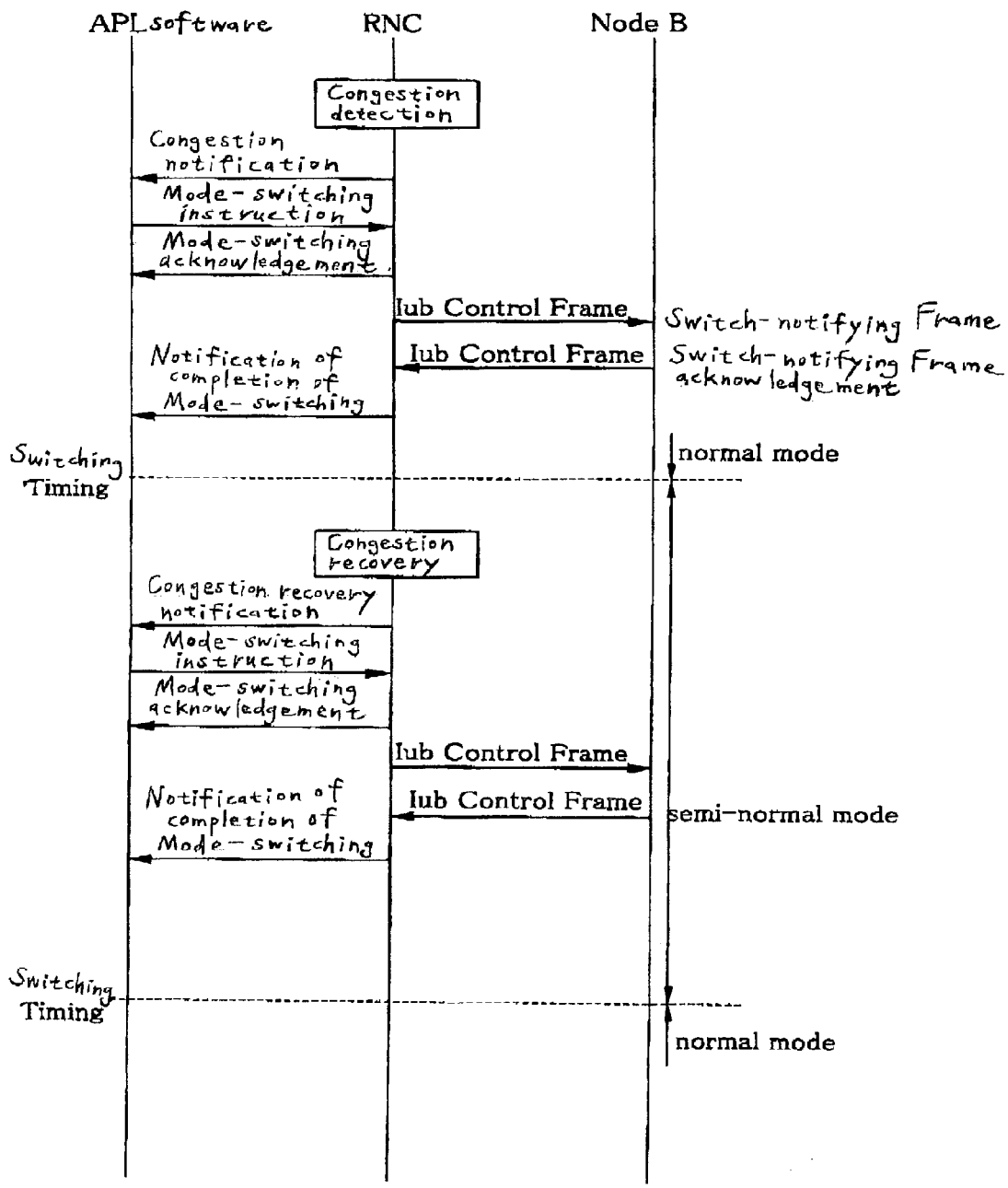
FIG. 15 shows a second example of the method in which the device automatically performs mode-switching when a congestion occurs in a WCDMA UTRAN system according to the third embodiment of the present invention.

FIG. 14 shows a first example of the method in which the device automatically performs mode-switching when a congestion occurs. FIG. 15 shows a second example of the method in which the device automatically performs mode-switching when a congestion occurs.

In the method shown in FIG. 14, when the RNC detects a congestion, the APL software is notified of the congestion, and the node B is notified of switching by an Iub control frame. The mode is then switched independently.

In the method of this example, unnecessary no-data frames are reduced to prevent user data from dropping as much as possible, unlike the method in which user data is normally deposed of in the order from the lowest priority to recover from a congestion. Therefore, the method of this example is effective as a means which prevents deterioration in quality at the time of heavy loads.

In the method shown in FIG. 15, when the RNC detects a congestion, the APL software is notified of the congestion. When an instruction for mode-switching is received from the APL software, the node B is notified of the instruction by an Iub control frame. Mode-switching is then performed.

In this method, the APL software which is notified of a congestion can instruct the RNC to perform mode-switching with respect to a call which has no priority. This method prevents deterioration in quality when heavy loads are applied, and is also advantageous for the case where a congestion which cannot be detected solely by the device occurs or the like.

Thus, in the WCDMA UTRAN system according to the present embodiment, the same advantages as those of the first embodiment can be attained. In addition, unnecessary no-data frames are reduced to prevent user data from dropping. Therefore, deterioration in quality can be prevented when heavy loads is applied.

Fourth Embodiment

In the WCDMA UTRAN system according to the present embodiment, the modes are not switched for every individual user but common or dedicated channels between nodes are secured to exchange notified data through the channels, so that all connections of an opposite device are notified, at once, of out-band mode-switching. The modes are thus switched for every device, with respect to all the connections handled by the device.

This method assumes that a long time is required for recovery if controls are carried out respectively for channels when a congestion occurs. Hence, this method is used for the following case or the like. That is, the modes of all channels are switched once to the semi-normal mode. The channels are sequentially and individually switched back to the normal mode in the order from the channel with the highest priority.

In this case, the mode-switching need not always be performed at once for all channels but may be performed at once for every service.

This method is a means advantageous for a congestion or the like because the modes can be switched at once in the order from the service which has no priority, particularly when there are devices respectively designated to services.

If this method is comprised, early recovery and securement of quality can be achieved when heavy loads are applied.

To be specific, in the operations of FIGS. 14 and 15 in the third embodiment, the connection for exchanging control frames is in-band (equal to the U-plane). However, in the present embodiment, a dedicated connection is provided separately, so that the sequences shown in FIGS. 14 and 15 which take place in units of users can be carried out at once together at the time of a congestion.

In addition, if an out-band negotiation is made with opposite nodes when the system starts up, it is possible to know which nodes correspond to the semi-normal mode. This knowledge can be used to reduce unnecessary primitives and traffics when a user connection is set.

Thus, in the WCDMA UTRAN system according to the present embodiment, the same advantages as those of the first embodiment can be attained. Further, unnecessary no-data frames are reduced to prevent user data from dropping, so that deterioration in quality can be prevented when heavy loads are applied. In addition, early recovery and securement of quality can be achieved when a congestion occurs.

Fifth Embodiment

In the WCDMA UTRAN system according to the present embodiment, the transmission timing interval (TTI) itself is changed. That is, a fast TTI is selected, when loads to the system are light like the case where the number of contained users is small. Alternatively, a slow TTI is set up, when loads to the system are heavy like the case where the number of contained users is small. In case of a congestion or the like, a device operating at the fast TTI is switched to the slow TTI, to reduce loads applied to the system and to increase the capacity or the like.

This method controls not only no-data frames but also the flow rate of user data frames. This method is also capable of reducing loads, even keeping the normal mode.

In the method according to the present embodiment, user data can be transferred at a high speed which contributes to a reduction in the averaged holding time of packet calls and the like. Accordingly, the response is quicker so that the channel occupation time per user can be reduced. The rate of utilization of channels can hence be expected to increase, advantageously for increase in the capacity of the entire system.

Thus, in the WCDMA UTRAN system according to the present embodiment, the same advantages as those of the first embodiment can be attained. In addition, loads can be reduced even kept in the normal mode. By thus making the response quicker, the rate of utilization of channels can be increased, and the capacity of the entire system can be increased.

In the above description, the embodiments of the present invention have been described in detail with reference to the drawings. Practical structures are not limited to these embodiments but the present invention includes modifications in design without deviating from the scope of the subject matter of the present invention. For example, the UE shown in FIG. 1 is not limited to a portable terminal but may be another device as long as the device supports the WCDMA system. In addition, the CN is not limited to an exchange network but may include an IP network. Each of the above embodiments has been described with respect only to the processing of switching from the normal mode to the semi-normal mode. However, processing of switching from the semi-normal mode to the normal mode can be performed in a similar manner.

Further, in the above embodiments, when a no-data frame is received from the RNC, the nodes B do not transmit data to the UE. However, the present invention is not restricted to such a constitution. In other words, in a case that the semi-normal mode is used in the downlink side in the direction from the RNC to the nodes B, it sometimes becomes necessary for the UE to correspond with such data.

Moreover, it is not necessary that the control frame for switching the modes is conducted by a lead of the RNC. It can be realized by a constitution that an Iub control frame is thrown by the nodes B in the direction of the RNC and then the RNC responds to the Iub control frame.

As has been described above, according to the WCDMA UTRAN system of the present invention, when no user data exists between the RNC and the node B (RNC→node B) in the WCDMA system, the flow rate of no-data frames which are exchanged periodically is controlled. Therefore, the band range necessary for the entire system can be restricted to contribute to economization of the UTRAN system.

Unnecessary no-data frames are reduced to prevent user data from dropping. Therefore, deterioration in quality can be prevented when heavy loads is applied.

What is claimed is:

1. A Universal Terrestrial Radio Access Network (UTRAN) system in a Wideband Code Division Multiple Access (WCDMA) system, said UTRAN system comprising:
   a node which communicates with a user equipment via a point Uu; and
   a radio network controller which communicates with a core network via a point Iu,
   wherein said node and said radio network controller are connected via a point Iub, a normal or silent mode is used for a dedicated channel in an uplink side in a direction from the node to the radio network controller, and the normal mode is used for the dedicated channel in a downlink side in a direction from the radio network controller to the node, and
   wherein a semi-normal mode is provided in which:
      when a no-data frame is received from the radio network controller, the node does not transmit data to the user equipment;
      when data is not received from the user equipment, the node transmits the no-data frame to the radio network controller for a predetermined period of transmission timing intervals;
      when data is not received from the node, the radio network controller does not transmit data to the core network; and
      when data is not received from the core network, the radio network controller transmits the no-data frame to the node for a specified period of transmission timing intervals.

2. The WCDMAN UTRAN system according to claim 1, wherein a data-non-receipt period in which the no data frame should be transmitted can be changed, based on an instruction from an upper level.

3. The WCDMA UTRAN system according to claim 1, Wherein switching from the normal mode to the semi-normal mode is executed after the radio network controller makes a negotiation with the node by a control frame.

4. The WCDMA UTRAN system according to claim 3, wherein the negotiation is started by an instruction from application software in an upper level.

5. The WCDMA UTRAN system according to claim 4, wherein the instruction from the application software is given based on a notification from the radio network controller to the application software when a congestion is detected.

6. The WCDMA UTRAN system according to claim 3, wherein the radio network controller autonomously starts the negotiation when a congestion is detected.

7. The WCDMA UTRAN system according to claim 1, wherein switching from the normal mode to the semi-normal mode is performed based on a notification from the radio network controller to the node when a connection is established.

8. The WCDMA UTRAN system according to claim 1, wherein switching from the normal mode to the semi-normal mode is performed based on an in-band notification.

9. The WCDMA UTRAN system according to claim 1, wherein switching from the normal mode to the semi-normal mode is performed based on an out-band notification.

10. The WCDMA UTRAN system according to claim 9, wherein switching from the normal mode to the semi-normal mode is performed at once with respect to all connections of an opposite device, based on the out-band notification.

11. The WCDMA UTRAN system according to claim 9, wherein switching from the normal mode to the semi-normal mode is performed at once for every service, based on the out-band notification.

12. The WCDMA UTRAN system according to claim 1, wherein in the semi-normal mode, the node integrates quality data of a period in which any no-data frame is not transmitted, and notifies the radio network controller of an integrated result by a next no-data frame.

13. The WCDMA UTRAN system according to claim 1, wherein the radio network controller and the node synchronously perform switching from the normal mode to the semi-normal mode.

14. The WCDMA UTRAN system according to claim 1, wherein the radio network controller and the node asynchronously perform switching from the normal mode to the semi-normal mode.

15. The WCDMA UTRAN system according to claim 14 wherein said asynchronous switching is performed, triggered by a receipt of a control frame.

16. The WCDMA UTRAN system according to claim 2, wherein switching from the normal mode to the semi-normal mode is executed after the radio network controller makes a negotiation with the node by a control frame.

17. The WCDMA UTRAN system according to claim 2, wherein switching from the normal mode to the semi-normal mode is performed based on a notification from the radio network controller to the node when a connection is established.

18. The WCDMA UTRAN system according to claim 2, wherein switching from the normal mode to the semi-normal mode is performed based on an in-band notification.

19. The WCDMA UTRAN system according to claim 2, wherein switching from the normal mode to the semi-normal mode is performed based on an out-band notification.

* * * * *